United States Patent [19]

Witteveen

[11] Patent Number: 4,756,586

[45] Date of Patent: Jul. 12, 1988

[54] DEVICE FOR HOLDING AND ADJUSTING A ROTATABLE BODY

[75] Inventor: Bontko Witteveen, Venlo, Netherlands

[73] Assignee: Oce-Nederland B.V., Venlo, Netherlands

[21] Appl. No.: 849,721

[22] Filed: Apr. 9, 1986

[30] Foreign Application Priority Data

Apr. 19, 1985 [NL] Netherlands .......................... 8501142

[51] Int. Cl.$^4$ .......................... G02B 7/18; G02B 26/10
[52] U.S. Cl. ...................................... 350/6.8; 350/616; 310/51
[58] Field of Search .................................. 350/6.5–6.9, 350/6.91, 616, 631, 632, 634–636; 310/51; 74/63, 212, 441, 815, 841

[56] References Cited

U.S. PATENT DOCUMENTS 4,443,043 4/1984 Yamaguchi .......................... 350/6.5

FOREIGN PATENT DOCUMENTS 787493 9/1935 France .................................. 310/51

547943 1/1979 Japan .................................. 350/616

Primary Examiner—John K. Corbin
Assistant Examiner—Loha Ben
Attorney, Agent, or Firm—Reed Smith Shaw & McClay

[57] ABSTRACT

A device for holding, adjusting and driving a rotatable body such as a polygonal mirror or a polygonal mirror firmly attached to a bushing is disclosed. The rotatable body has a central bore which encloses an axis of rotation and is provided with a means for connecting the rotatable body to the axis of rotation. The means for connecting the rotatable body to the axis of rotation comprises a first fastening zone wherein the rotatable body is rigidly connected to the axis of rotation by an interference fit and a second fastening zone located at a distance from the first fastening zone on the axis of rotation, wherein set screws spaced at regular intervals over the circumference of the rotatable body and are used to position the rotatable body relative to the axis of rotation. Preferably, the central bore of the rotatable body in the area of overlap has a diameter larger than the diameter of the axis of rotation contained therein other than in the first fastening zone.

8 Claims, 2 Drawing Sheets

DEVICE FOR HOLDING AND ADJUSTING A ROTATABLE BODY

BACKGROUND OF THE INVENTION

1. Field of the Invention

The present invention relates to a device for holding, adjusting and driving a rotatable body such as a polygonal mirror useful in devices such as a nonmechanical printer.

2. Description of the Prior Art

German Patent Specification No. 27 17 299 and its corresponding U.S. Pat. No. 4,147,401 along with its French Pat. No. 2,388,291 all describe a rotatable polygonal mirror which is connected to an axis of rotation by use of an adjusting disc having a plurality of set screws. The adjusting disc is rigidly attached to the axis of rotation, i.e. the drive shaft. The polygonal mirror is pressed against the set screws of the adjusting disc using a resilient element so that the mirror can be positioned relative to the axis of rotation by means of the set screws.

This device has the drawback that the required positioning is obtained against the action of a certain spring force, so that precise positioning may be disturbed upon rotation of the body (certainly at high speeds). Additionally, the drive torque of the axis of rotation is transmitted to the rotatable body through a resilient element possibly resulting in a difference between the rotational speed of the axis of rotation and the rotational speed of the rotatable body.

U.S. Pat. No. 4,141,620 describes another device for holding and adjusting a polygon mirror. This device, however, uses an air bearing and requires that the polygon mirror be enclosed within the air bearing. Also, the polygon mirror is resiliently fixed to the drive shaft.

U.S. Pat. No. 2,010,411 and German Pat. No. 639,296 disclose devices for holding and adjusting mirror wheels which utilize a disc to hold and adjust them. These devices suffer from the same disadvantages as the device described in U.S. Pat. No. 4,147,401. Similarly, Japanese Abstract 59-30513 entitled Rotary Polyhedral Mirror Body only describes a way to prevent deviations in the plane of rotation of a polyhedral mirror caused by fastening the mirror to the axis of rotation by means of a set screw and does not solve the disadvantages discussed above.

SUMMARY OF THE INVENTION

Generally, the present invention comprises a rotatable body having a central bore which encloses an axis of rotation and a means for connecting the rotatable body to the axis of rotation, wherein the means for connecting the rotatable body to the axis of rotation comprises a first fastening zone wherein the rotatable body is rigidly connected to the axis of rotation, and a second fastening zone located at a distance from the first fastening zone on the axis of rotation, wherein set screws are spaced at regular intervals over the circumference of the rotatable body, the set screws being able to be screwed through the rotatable body towards the axis of rotation in order to position the rotatable body relative to the axis of rotation and wherein the central bore of the rotatable body in the area of overlap has a diameter larger than the diameter of the axis of rotation contained therein other than in the first fastening zone.

Thus, the present invention provides a device which eliminates the disadvantages of the prior art.

A pronounced, stable positioning of the rotatable body relative to the axis of rotation such as the drive shaft is obtained in a simple way by the present invention. Preferably, the rigid connection in the first fastening zone is achieved by means of an interference fit. Thus, a reliable connection between the rotatable body and the axis of rotation is formed in the present invention in a simple way.

The present invention is well suited to be used as a support for a second rotatable body, such as a polygonal mirror. With the aid of the set screws fitted in the second fastening zone, the first rotatable body can be adjusted relative to the axis of rotation so that the plane of rotation of the second rotatable body, such as the polygonal mirror, is perpendicular to the axis of rotation. In another embodiment, the first rotatable body can be a polygonal mirror without the need for a second rotatable body.

Other features and advantages of the present invention will be apparent from the following detailed description and with reference to the accompanying drawings.

DESCRIPTION OF THE PREFERRED EMBODIMENTS

As used herein, the term "axis of rotation" is synonymous and interchangeable with the term "drive shaft".

Figure 1:
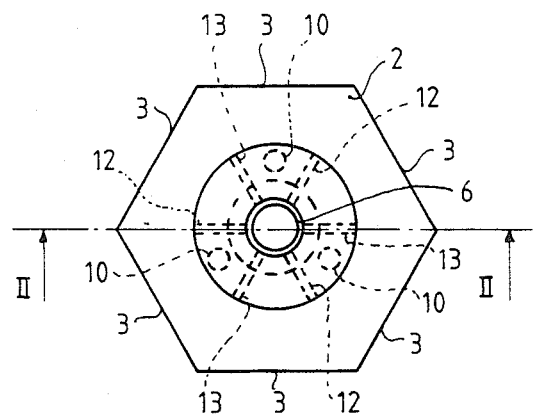
FIG. 1 is a top view of a first embodiment of the device according to the present invention utilizing two rotatable bodies.
Figure 2:
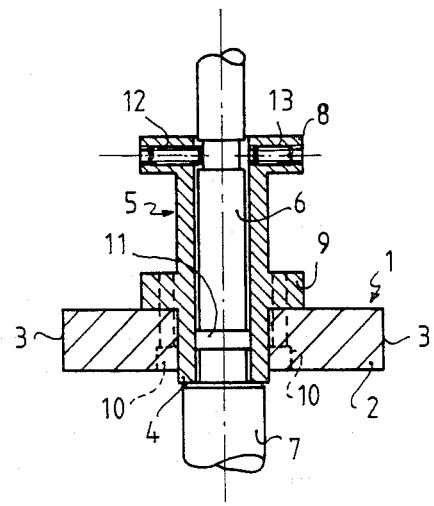
FIG. 2 is a cross-section taken along line II—II of FIG. 1.

FIGS. 1 and 2 represent a device for driving and positioning a first rotatable body such as a bearing bush 5 which is rigidly connected to a second rotatable body such as a polygonal mirror 1. Polygonal mirror 1 consists of a hexagonal disc 2 which has its side faces 3 provided with specular reflecting surfaces. Disc 2 has a central bore whereby it can be mounted on end 4 of a bearing bush 5. Bearing bush 5 in turn is rigidly connected to an axis of rotation such as shaft end 6 of drive shaft 7 of a motor which is not shown.

Bearing bush 5 is generally cylinder-shaped except for two flange-like thickenings 8 and 9. The inner diameter of bearing bush 5 is larger than the diameter of shaft end 6. Preferably, the difference in diameter between them is between 100 μm and 1 mm. The rigid connection between polygonal mirror 1 and bearing bush 5 is accomplished by means of a plurality of screws 10 spaced at equal distances over the circumference which are screwed through disc 2 into flange 9 of bearing bush 5. Many other known connecting techniques such as gluing can also be utilized to make this rigid connection.

The fastening of bearing bush 5 to shaft end 6 is effected in two fastening zones. The first fastening zone is formed by a thickening 11 in the width of shaft end 6 by some millimeters. Thickened shaft end 6 has such a diameter that, in combination with the inner diameter of bearing bush 5, an interference fit is created so that bearing bush 5 is rigidly connected to shaft end 6 at that place. Starting from the requirement that slip may not occur between shaft end 6 and bearing bush 5, the required quality of the fit is determined by the mass of the device and the drive torque of the motor. Based on these conditions, those skilled in the art can select the proper fit for every diameter of shaft 6.

The second fastening zone is situated at flange 8 of bearing bush 5. Three set screws 12 are provided in flange 8 spaced at equal distances over its circumference. These screws can be screwed in the radial direction towards the locally narrowed shaft end 6. Movement of set screws 12 in the radial direction relative to shaft end 6 will cause bearing bush 5 to be tilted about the first fastening zone. By tilting bearing bush 5 carrying polygonal mirror 1, it is possible to adjust the plane of rotation of polygonal mirror 1 so that it is perpendicular to drive shaft 6. The center of tilt and the first fasening zone are situated in the center of the polygonal mirror 1 so that movements other than tilting are eliminated as much as possible.

Bearing bush 5 should be rigid so that deformation cannot occur but only tilting about the first fastening zone. The desired rigidity is achieved by a combination of material choice and dimensioning. A suitable material for bearing bush 5 is carbon steel.

Movement of the three set screws 12 may cause an unbalance in the rotation of polygonal mirror 1. Accordingly, three balance screws 13 are fitted in flange 8 between the three set screws 12. Correct radial movement of balance screws 13 makes it possible to balance the rotation of the device again.

Figure 3:
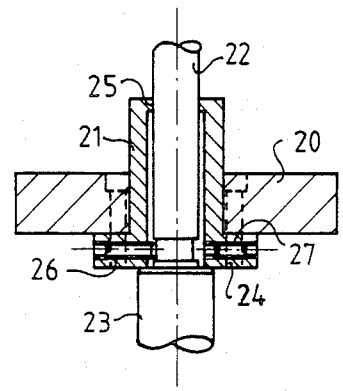
FIG. 3 is a cross-section of a second embodiment of the device according to the present invention utilizing two rotatable bodies.

FIG. 3 shows the cross-section of a second embodiment of the device according to the present invention. In the same way as described with respect to FIGS. 1 and 2, a polygonal mirror 20 is rigidly connected to a bearing bush 21. Again, this bearing bush is in its turn rigidly attached to shaft end 22 of a drive shaft 23 by means of two fastening zones. The shape of bearing bush 21 is similar to the shape of bearing bush 5 described in FIGS. 1 and 2; however, only one flange-like thickening 24 is provided.

This second embodiment also uses two fastening zones between bearing bush 21 and shaft end 22. A first fastening zone 25 is formed at one end of bearing bush 21 and a second fastening zone is formed at the place of flange 24. In first fastening zone 25, a rigid connection is again accomplished through an interference fit for which the same conditions and demands as described with respect to FIGS. 1 and 2 are applicable. Three set screws 26 are fitted in flange 24 with which the position of bearing bush 21 relative to shaft end 22 can be adjusted through tilting about first fastening zone 25. Three balance screws 27 in flange 24 offer the possibility to balance the device in the same way screws 13 do in the first embodiment.

Figure 4:
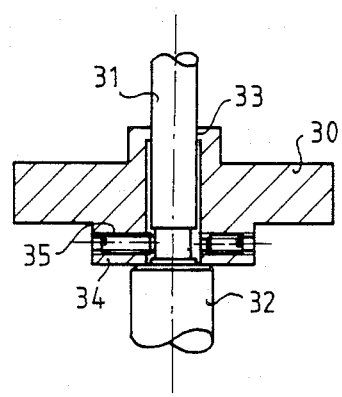
FIG. 4 is a cross-section of a third embodiment of the device according to the present invention utilizing only one rotatable body.

Finally, FIG. 4 represents a cross-sectional view of a third embodiment of the device according to the present invention. In this third embodiment, polygonal mirror 30 is the rotatable body and is attached directly to shaft end 31 of drive shaft 32. For that purpose, polygonal mirror 30 is provided with a central bore having a diameter that, for practically its entire length, is larger than the diameter of the shaft end 31. Preferably, it is 100 μm to 1 mm larger. The attachment of polygonal mirror 30 is accomplished by means of two fastening zones, just as is the attachment of bearing bushes 5 and 21, respectively, in the previously described embodiments shown in FIGS. 2 and 3. First fastening zone 33 forms a rigid connection through an interference fit. Again, second fastening zone 34 is designed with the ability to adjust the position of polygonal mirror 30 relative to drive shaft 32 by means of three set screws 35 and balance screws.

All three of the above-described embodiments for a rotatable body such as a polygonal mirror can be used in an electrophotographic image-forming device such as described in U.S. Pat. No. 4,140,903.

While presently preferred embodiments of the invention have been described and shown in the drawings with particularity, the invention may be otherwise embodied within the scope of the appended claims.

What is claimed is:

1. A device comprising a first rotatable body having a central bore which encloses a drive shaft and a means for connecting the first rotatable body to the drive shaft, wherein the means for connecting the first rotatable body to the drive shaft comprises a first fastening zone wherein the first rotatable body is rigidly connected to the drive shaft and a second fastening zone located at a distance from the first fastening zone on the drive shaft wherein a plurality of set screws are spaced over the circumference of the first rotatable body, said set screws being able to be screwed through the first rotatable body towards the drive shaft in order to position the first rotatable body relative to the drive shaft and wherein the central bore of the first rotatable body where it encloses the drive shaft has a diameter larger than the diameter of the drive shaft, except in the first fastening zone.

2. A device as described in claim 1 wherein the means for rigidly connecting the first rotatable body to the drive shaft in the first fastening zone is an interference fit.

3. A device as described in claim 2 further comprising a second rotatable body rigidly connected to the first rotatable body wherein the first rotatable body can be adjusted relative to the drive shaft such that the plane of rotation of the second rotatable body is perpendicular to the drive shaft.

4. A device as described in claim 3 wherein the second rotatable body comprises a polygonal mirror.

5. A device as described in claim 2 wherein the first rotatable body comprises a polygonal mirror.

6. A device as described in claim 1 further comprising a second rotatable body rigidly connected to the first rotatable body wherein the first rotatable body can be adjusted relative to the drive shaft such that the plane of rotation of the second rotatable body is perpendicular to the drive shaft.

7. A device as described in claim 6 wherein the second rotatable body comprises a polygonal mirror.

8. A device as described in claim 1 wherein the first rotatable body comprises a polygonal mirror.

* * * * *